United States Patent
Kitazawa et al.

(10) Patent No.: US 8,854,706 B2
(45) Date of Patent: Oct. 7, 2014

(54) AUTO DOCUMENT FEEDING DEVICE

(75) Inventors: Osamu Kitazawa, Kanagawa (JP);
Masakazu Iwamoto, Kanagawa (JP);
Shinichi Miyakawa, Kanagawa (JP);
Seiji Iino, Kanagawa (JP); Akihito Tokutsu, Kanagawa (JP); Mitsunori Ishii, Tokyo (JP); Naoki Shoji, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 982 days.

(21) Appl. No.: 12/828,487

(22) Filed: Jul. 1, 2010

(65) Prior Publication Data

US 2011/0007370 A1    Jan. 13, 2011

Related U.S. Application Data

(60) Provisional application No. 61/223,505, filed on Jul. 7, 2009.

(51) Int. Cl.
| | | |
|---|---|---|
| *H04N 1/04* | (2006.01) | |
| *H04N 1/00* | (2006.01) | |
| *B65H 5/26* | (2006.01) | |
| *B65H 5/38* | (2006.01) | |
| *H04N 1/12* | (2006.01) | |

(52) U.S. Cl.
CPC .............. *B65H 5/38* (2013.01); *H04N 1/00657* (2013.01); *H04N 1/00588* (2013.01); *H04N 1/00628* (2013.01); *H04N 1/00602* (2013.01); *H04N 1/0057* (2013.01); *B65H 2801/39* (2013.01); *B65H 2404/63* (2013.01); *B65H 5/26* (2013.01); *H04N 1/121* (2013.01); *H04N 1/00631* (2013.01); *H04N 1/0062* (2013.01)
USPC .................... 358/498; 358/496; 358/497

(58) Field of Classification Search
CPC .................... H04N 1/193; H04N 2201/00631; H04N 1/0057; H04N 2201/00619; H04N 1/121; H04N 1/12
See application file for complete search history.

(56) References Cited

U.S. PATENT DOCUMENTS

| | | | | | |
|---|---|---|---|---|---|
| 5,005,052 | A | * | 4/1991 | Watanabe et al. | 399/373 |
| 5,151,745 | A | * | 9/1992 | Durland et al. | 399/304 |
| 6,038,424 | A | * | 3/2000 | Nakagawa | 399/367 |
| 6,166,394 | A | * | 12/2000 | Rubscha | 250/559.42 |
| 6,618,575 | B2 | * | 9/2003 | Takida et al. | 399/367 |
| 6,809,796 | B2 | * | 10/2004 | Sugeta | 355/40 |
| 7,021,619 | B2 | * | 4/2006 | Watanabe et al. | 271/3.14 |
| 7,380,787 | B2 | * | 6/2008 | Fukumura | 271/264 |
| 7,385,735 | B2 | * | 6/2008 | Makino et al. | 358/496 |

(Continued)

FOREIGN PATENT DOCUMENTS

| | | | |
|---|---|---|---|
| JP | 200334450 A | | 2/2003 |
| JP | 2004256229 A | | 9/2004 |
| JP | 2006140902 A | * | 6/2006 |

*Primary Examiner* — Cheukfan Lee
(74) *Attorney, Agent, or Firm* — Patterson & Sheridan LLP

(57) ABSTRACT

An auto document feeding device includes: a carrying member configured to carry an original from an original setting unit to an image scanning unit; a fixed guide unit configured to change a carrying direction of the original, at between the carrying member and the image scanning unit; a movable guide unit which is movable between the fixed guide unit and the carrying member; and a paper discharge unit configured to discharge the original which passed through the image scanning unit.

14 Claims, 14 Drawing Sheets

(56) References Cited

U.S. PATENT DOCUMENTS

| | | |
|---|---|---|
| 7,466,956 B2 | 12/2008 | Shoji |
| 7,646,515 B2 * | 1/2010 | Ichinose ................. 358/496 |
| 7,755,815 B2 * | 7/2010 | Nakamura et al. ............ 358/498 |
| 7,999,976 B2 * | 8/2011 | Lee ................. 358/498 |
| 8,503,048 B2 * | 8/2013 | Tokutsu ................. 358/498 |
| 2001/0033761 A1 * | 10/2001 | Takida et al. ................. 399/367 |
| 2006/0220304 A1 * | 10/2006 | Miyazaki et al. ............. 271/207 |
| 2009/0251744 A1 * | 10/2009 | Tokutsu ................. 358/498 |
| 2012/0182590 A1 * | 7/2012 | Iino et al. ................. 358/498 |
| 2012/0262766 A1 * | 10/2012 | Ishii et al. ................. 358/498 |

* cited by examiner

AUTO DOCUMENT FEEDING DEVICE

CROSS-REFERENCE TO RELATED APPLICATION

This application is based upon and claims the benefit of priority from provisional U.S. Application 61/223,505 filed on Jul. 7, 2009, the entire contents of which are incorporated herein by reference.

FIELD

Embodiments described herein relate generally to an auto document feeding device which carries an original to an image scanning device at a high speed.

BACKGROUND

In an image scanning device such as a scanner used for an image forming apparatus such as a copy machine or printer, increase in the image scanning speed is demanded. Conventionally, a space is provided between a preceding original and the following, thus avoiding inconvenience due to a collision between the originals. Therefore, increase in the speed of carrying originals to a scanning sensor in the case of continuously scanning originals is hampered and it may not be possible to cope with the demand for increase in the image scanning speed.

It is demanded that an auto document feeding device is developed which carries originals to an image scanning position at a high speed without damaging the originals in the case of continuously scanning the originals, realizes efficient scanning of the originals and hence realizes higher image scanning speeds.

DETAILED DESCRIPTION

According to an embodiment, an auto document feeding device includes: a carrying member configured to carry an original from an original setting unit to an image scanning unit; a fixed guide unit configured to change a carrying direction of the original, at between the carrying member and the image scanning unit; a movable guide unit which is movable between the fixed guide unit and the carrying member; and a paper discharge unit configured to discharge the original which passed through the image scanning unit.

Figure 1:
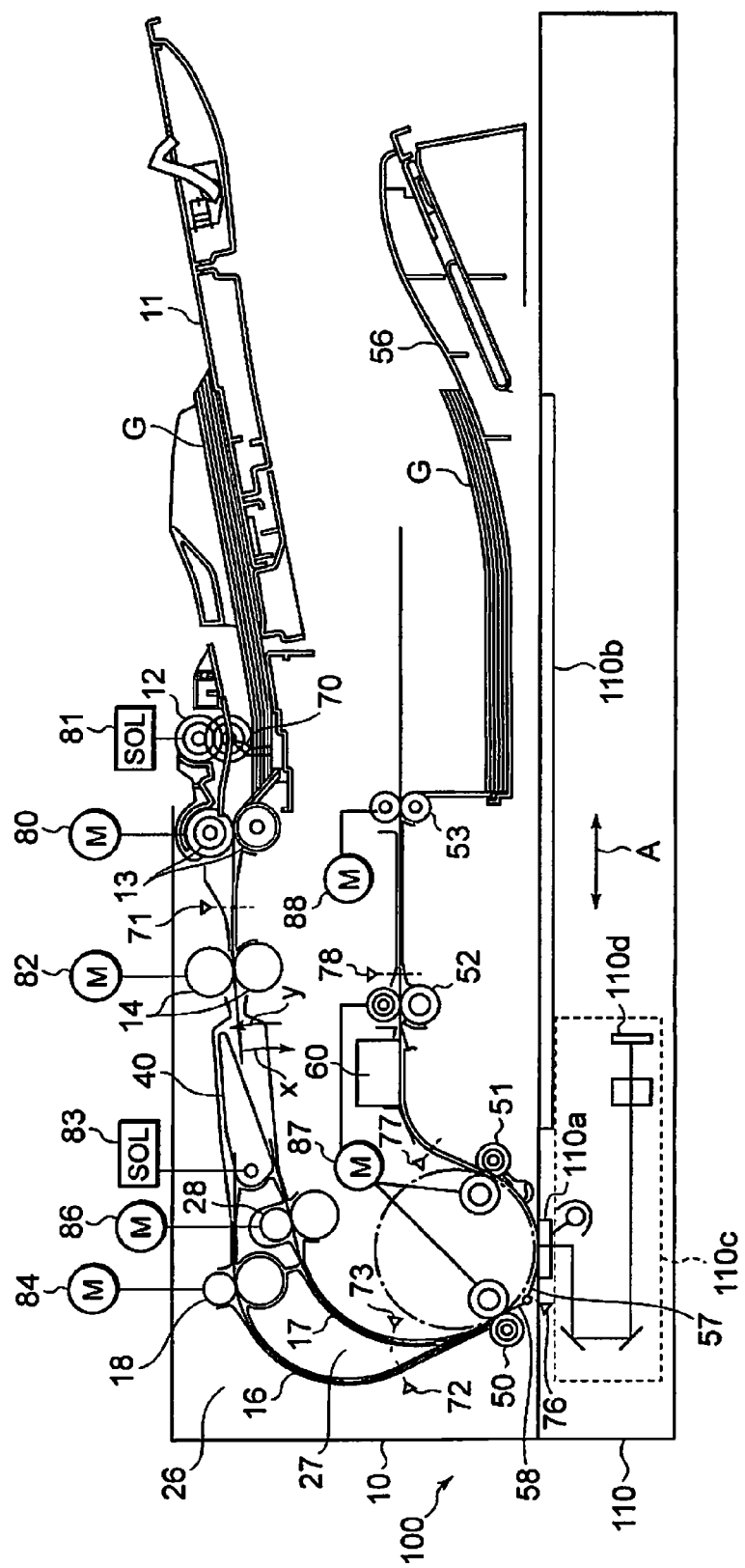
FIG. 1 is a view of configuration schematically showing an image scanning device according to an embodiment.

Hereinafter, an embodiment will be described. FIG. 1 shows an image scanning device 100 according to the embodiment. The image scanning device 100 has a scanner 110, which is an image scanning unit, and an auto document feeding device (ADF) 10 which carries an original G to the scanner 110. The scanner 110 has a READ original glass 110*a* and a platen glass 110*b*. The scanner 110 has an optical mechanism 110*c*. The optical mechanism 110*c* optically scans an image of the original G traveling on the READ original glass 110*a*. Alternatively, the optical mechanism 110*c* moves in the direction of arrow A shown in FIG. 1 along the platen glass 110*b* and optically scans the image of the original G set on the platen glass 110*b*. The scanner 110 has a CCD (charge coupled device) 110*d* which photoelectrically converts an optical signal from the optical mechanism 110*c* to an electric signal.

The ADF 10 has an original tray 11, which is an original setting unit, a pickup roller 12 which takes out the original G from the original tray 11, separation paper supply rollers 13 which prevent double feed of the original G, and a registration roller pair (RGT roller pair) 14 which aligns the forward end of the original G taken out and carried from the original tray 11. The ADF 10 has two paths, that is, an OUT path 16 as a first carrying path from the RGT roller pair 14 to the scanner 110, and an IN path 17 as a second carrying path from the RGT roller pair 14 to the scanner 110. The OUT path 16 has an intermediate OUT roller pair 18. The IN path 17 has an intermediate IN roller pair 28.

The ADF 10 has a gate 40 which branches the original G taken out from the original tray 11 and passed through the RGT roller pair 14, to one of the OUT path 16 and the IN path 17.

The ADF 10 has a pre-scan roller pair 50 as a carrying member which carries the original G passed through the OUT path 16 or the IN path 17 to the READ original glass 110a of the scanner 110, a post-scan roller pair 51 which discharges the original G from the READ original glass 110a, a pre-discharge roller pair 52, a paper discharge roller pair 53, and a paper discharge tray 56. The ADF 10 has a contact image sensor (CIS) 60, which is a second image scanning unit, for example, between the post-scan roller pair 51 and the pre-discharge roller pair 52. The CIS 60 may be provided in a carrying path extending from the pre-discharge roller pair 52 to the paper discharge roller pair 53.

The READ original glass 110a scans an image on the face side as a first side of the traveling original G. The CIS 60 scans an image on the back side as a second side of the traveling original G. Thus, it is possible to scan the images on both sides of the original G by passing the original once.

Figure 2:
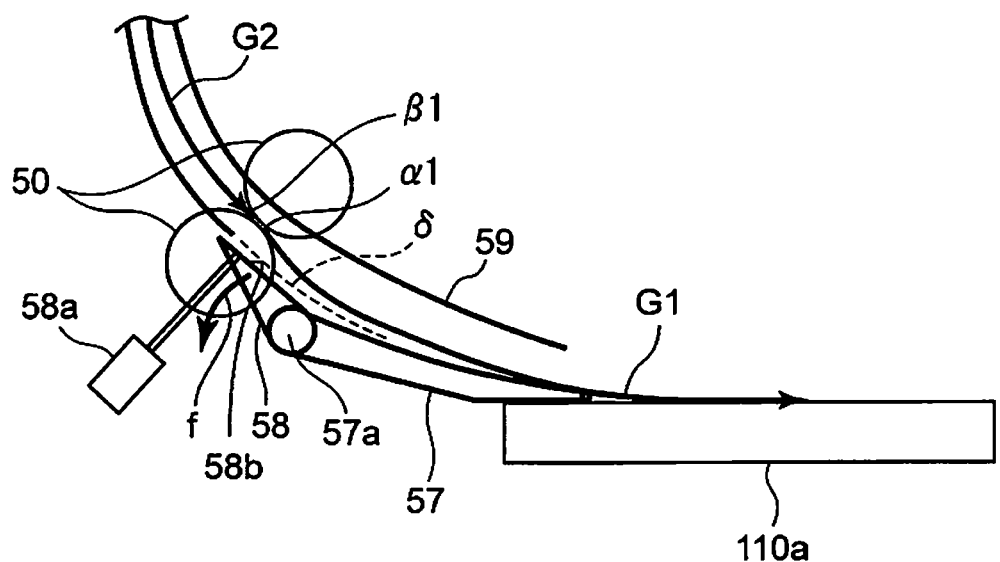
FIG. 2 is a schematic view of configuration showing a first pre-scanning guide and a second pre-scanning guide that is situated at a guide position according to the embodiment.

As shown in FIG. 2, the ADF 10 has a first pre-scan guide 57 as a fixed guide unit facing an inner guide 59, and a second pre-scan guide 58 as a movable guide unit, between the pre-scan roller pair 50 and the READ original glass 110a. The first pre-scan guide 57 supports the second pre-scan guide 58 rotatably about a fulcrum 57a. The ADF 10 has a guide solenoid 58a which rotates the second pre-scan guide.

The second pre-scan guide 58 is situated at a guide position shown in FIG. 2 when the guide solenoid 58a is off. When the guide solenoid 58a is on, the second pre-scan guide 58 rotates in the direction of arrow f and moves to a retreat position shown in FIG. 3. The first pre-scan guide 57 and the second pre-scan guide 58 situated at the guide position form a curved path indicated by the dotted line δ which curves the carrying direction of the original G passed through the pre-scan roller pair 50 and thus changes the carrying direction toward the READ original glass 110a. A guide surface 58b of the second pre-scan guide 58 situated at the guide position is substantially parallel to the normal line of the nip of the pre-scan roller pair 50 indicated by the dotted line γ. When the second pre-scan guide 58 is situated at the retreat position, the second pre-scan guide 58 is located outside of the curved path. The guide surface 58b of the second pre-scan guide 58 situated at the retreat position is outside of the normal line of the nip of the pre-scan roller pair 50 indicated by the dotted line γ.

The ADF 10 has an empty sensor 70 which detects the presence or absence of the original G, above the original tray 11. The ADF 10 has a registration sensor 71 which detects arrival of the original G at the RGT roller pair 14, between the separation paper discharge rollers 13 and the RGT roller pair 14. The ADF 10 has, in the OUT path 16, the RGT roller pair 14 and a paper timing sensor OUT 72 as a detection sensor which detects the drive timing of the intermediate OUT roller pair 18. The ADF 10 has, in the IN path 17, the RGT roller pair 14 and a paper timing sensor IN 73 as a detection sensor which detects the drive timing of the intermediate IN roller pair 28.

The ADF 10 has a pre-reading sensor 76 between the pre-scan roller pair 50 and the READ original glass 110a. The ADF 10 has a reading sensor 77 between the post-scan roller pair 51 and the pre-discharge roller pair 52. The ADF 10 has a paper discharge sensor 78 between the pre-discharge roller pair 52 and the paper discharge roller pair 53.

The ADF 10 has a paper feed motor 80, a pickup solenoid 81, a registration motor (RGT motor) 82, and a gate solenoid 83. The paper feed motor 80 rotates the pickup roller 12 and the separation paper supply rollers 13. The pickup solenoid 81 causes the pickup roller 12 to fluctuate. The RGT motor 82 rotates the RGT roller pair 14. The gate solenoid 83 switches the gate 40. When the gate solenoid 83 is turned off, the gate 40 turns in the direction of arrow x and branches the original G to the OUT carrying unit 26. When the gate solenoid 83 is turned on, the gate 40 turns in the direction of arrow y and branches the original G to the IN carrying unit 27.

The ADF 10 has an intermediate OUT motor 84, an intermediate IN motor 86, a READ motor 87, and a paper discharge motor 88. The intermediate OUT motor 84 rotates the intermediate OUT roller pair 18. The intermediate IN motor 86 rotates the intermediate IN roller pair 28. The READ motor 87 rotates the pre-scan roller pair 50, the post-scan roller pair 51 and the pre-discharge roller pair 52. The paper discharge motor 88 rotates the paper discharge roller pair 53.

Figure 4:
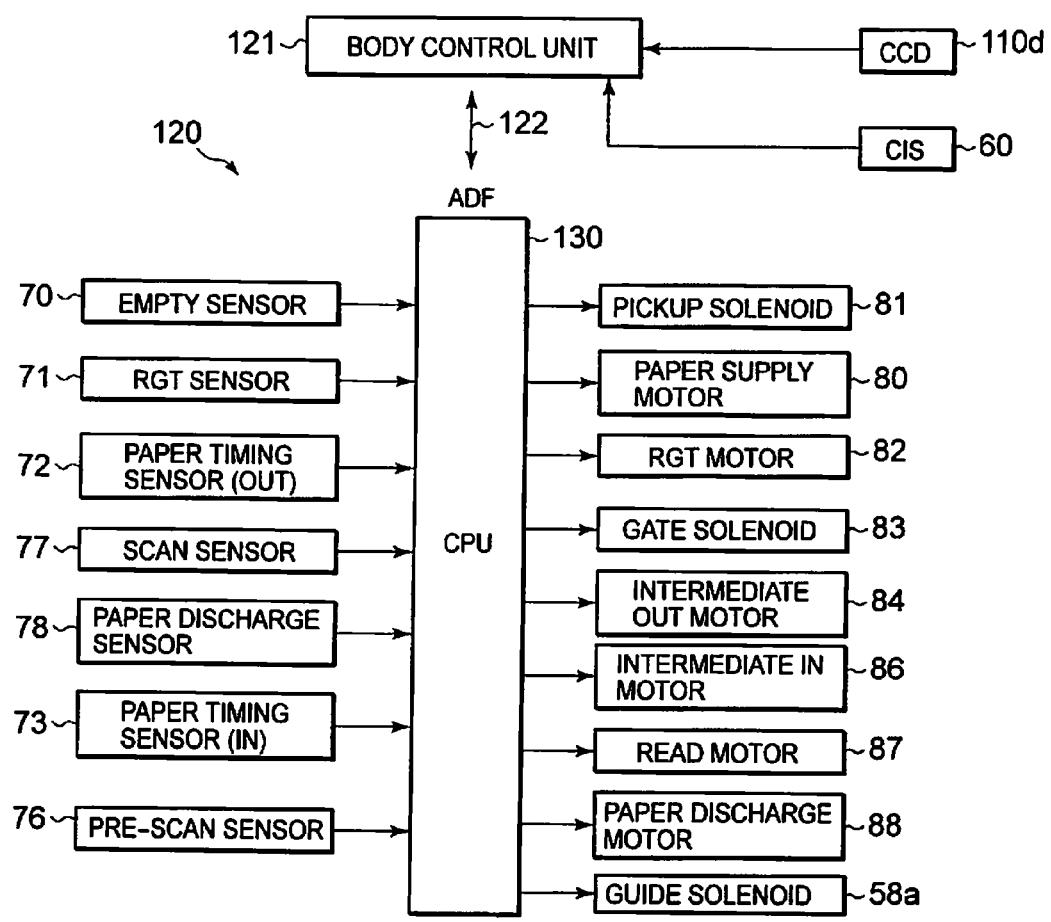
FIG. 4 is a block diagram showing a control system of an ADF according to the embodiment.
Figure 5:
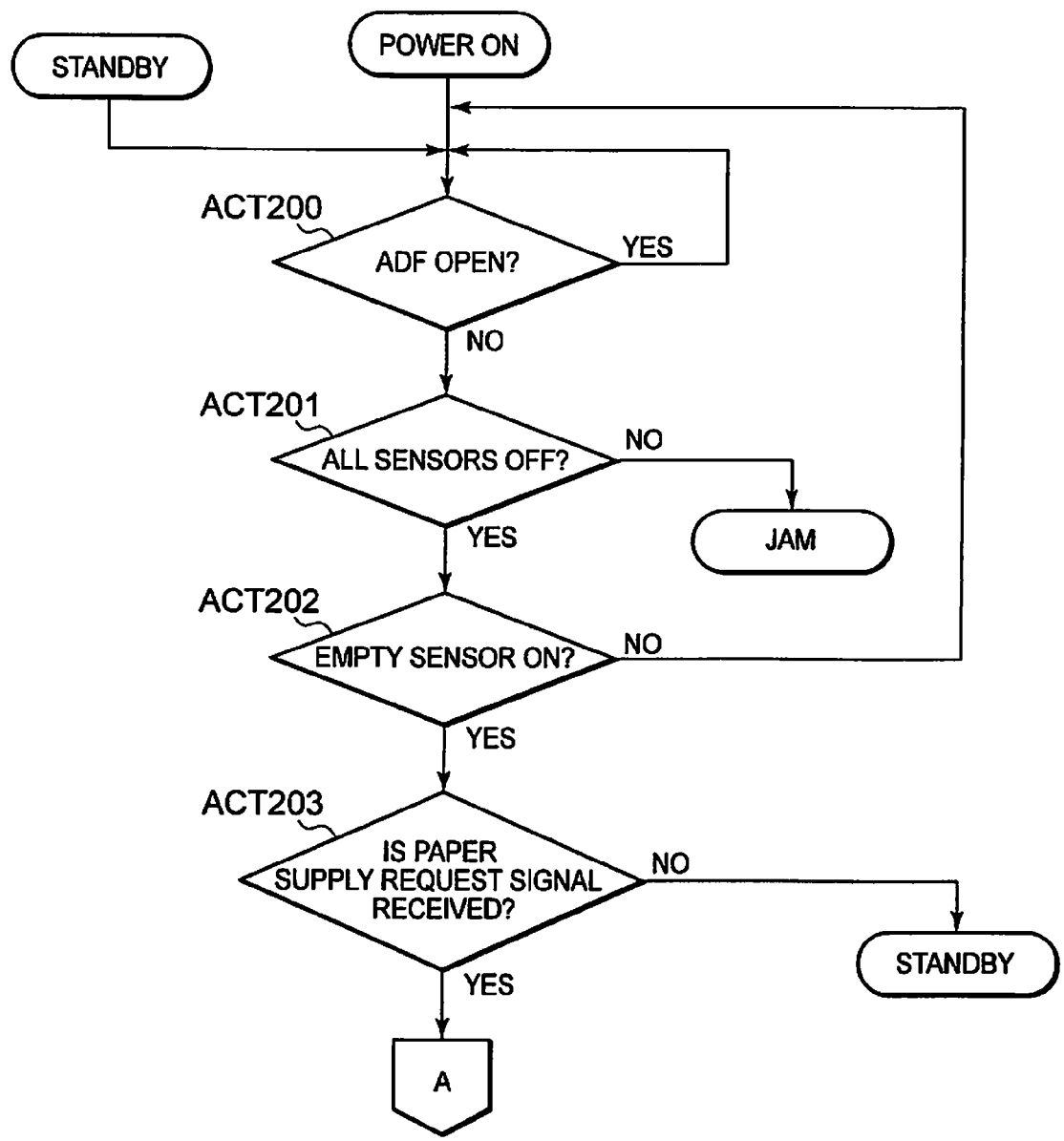
FIG. 5 is a flowchart showing operations from turning on of power to the start of supply of an original according to the embodiment.
Figure 6:
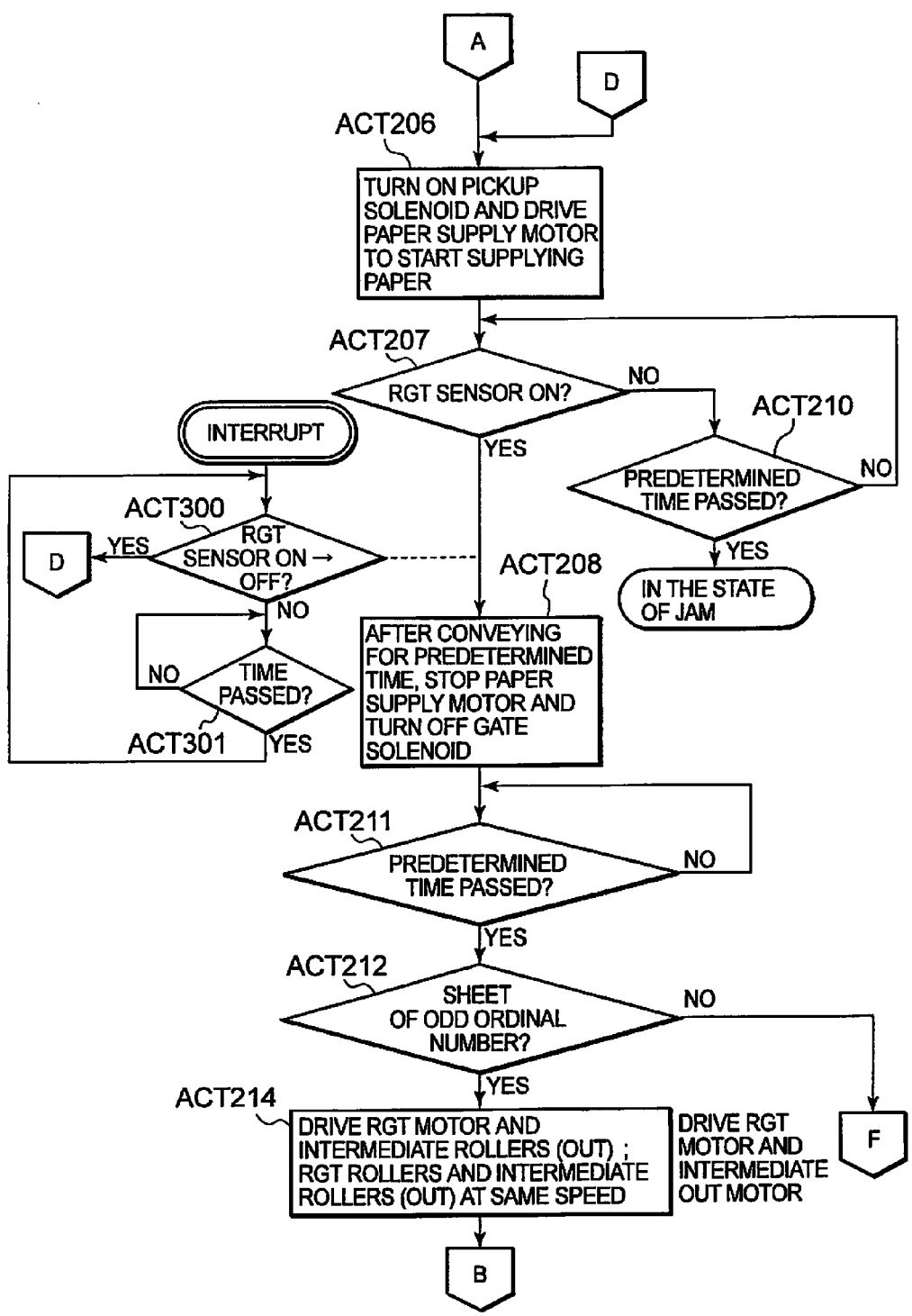
FIG. 6 is a flowchart showing operations to supply the original and carry the original to an OUT carrying unit according to the embodiment.
Figure 7:
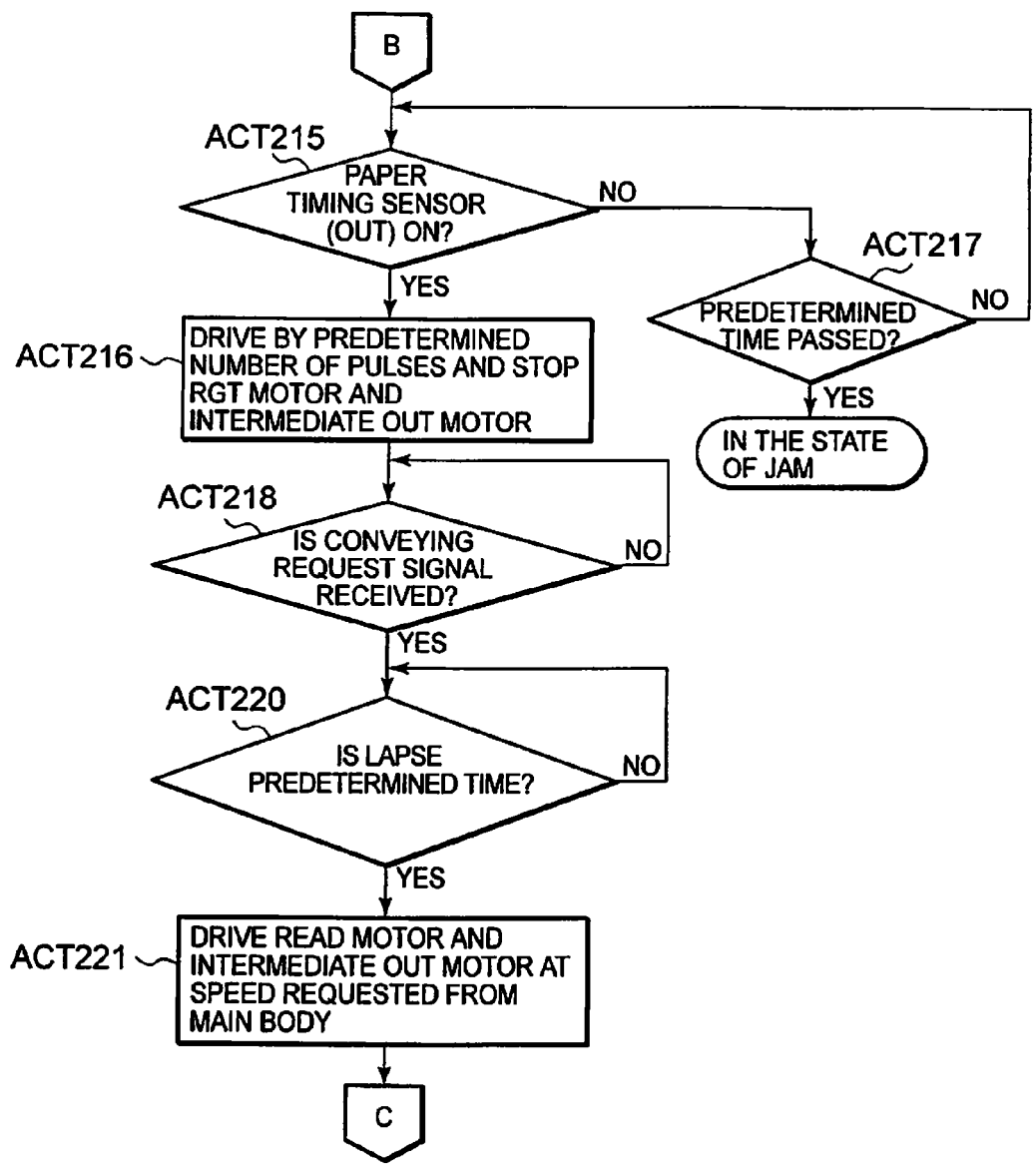
FIG. 7 is a flowchart showing an operation to carry the original by using the OUT carrying unit according to the embodiment.
Figure 8:
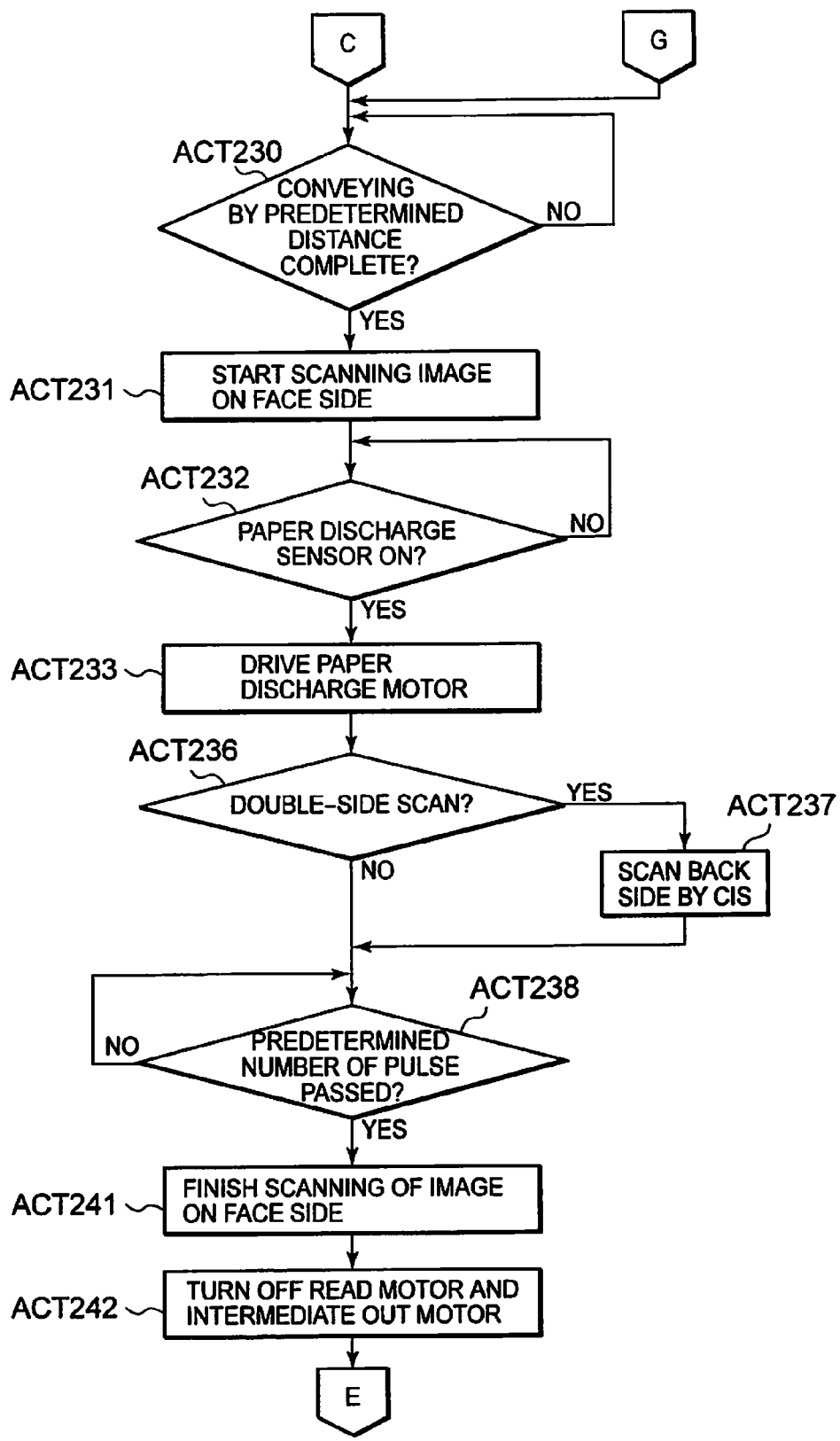
FIG. 8 is a flowchart showing operations from the start of image scanning to the end of scanning according to the embodiment.
Figure 9:
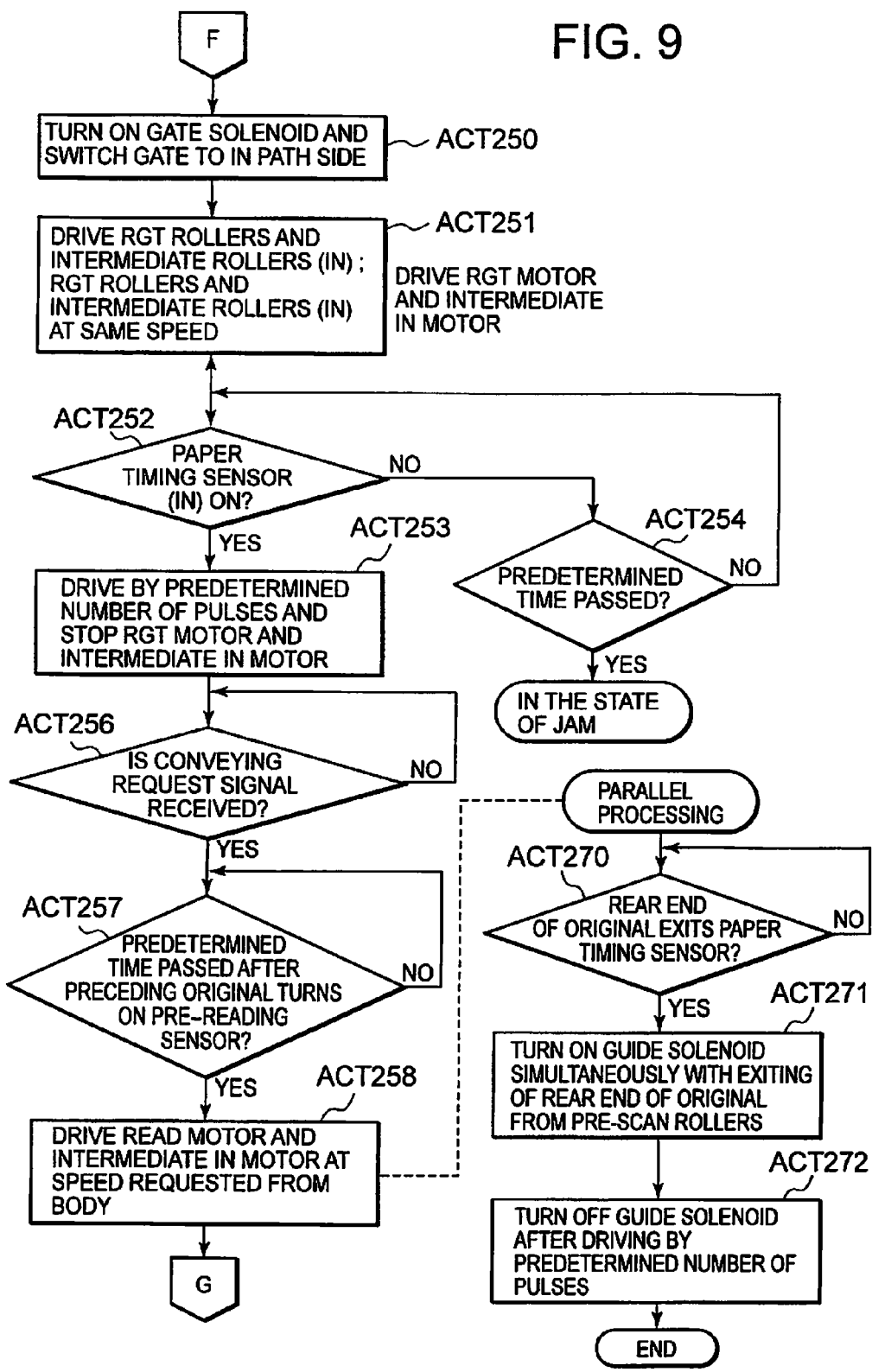
FIG. 9 is a flowchart showing an operation to carry the following original by using an IN carrying unit according to the embodiment.
Figure 10:
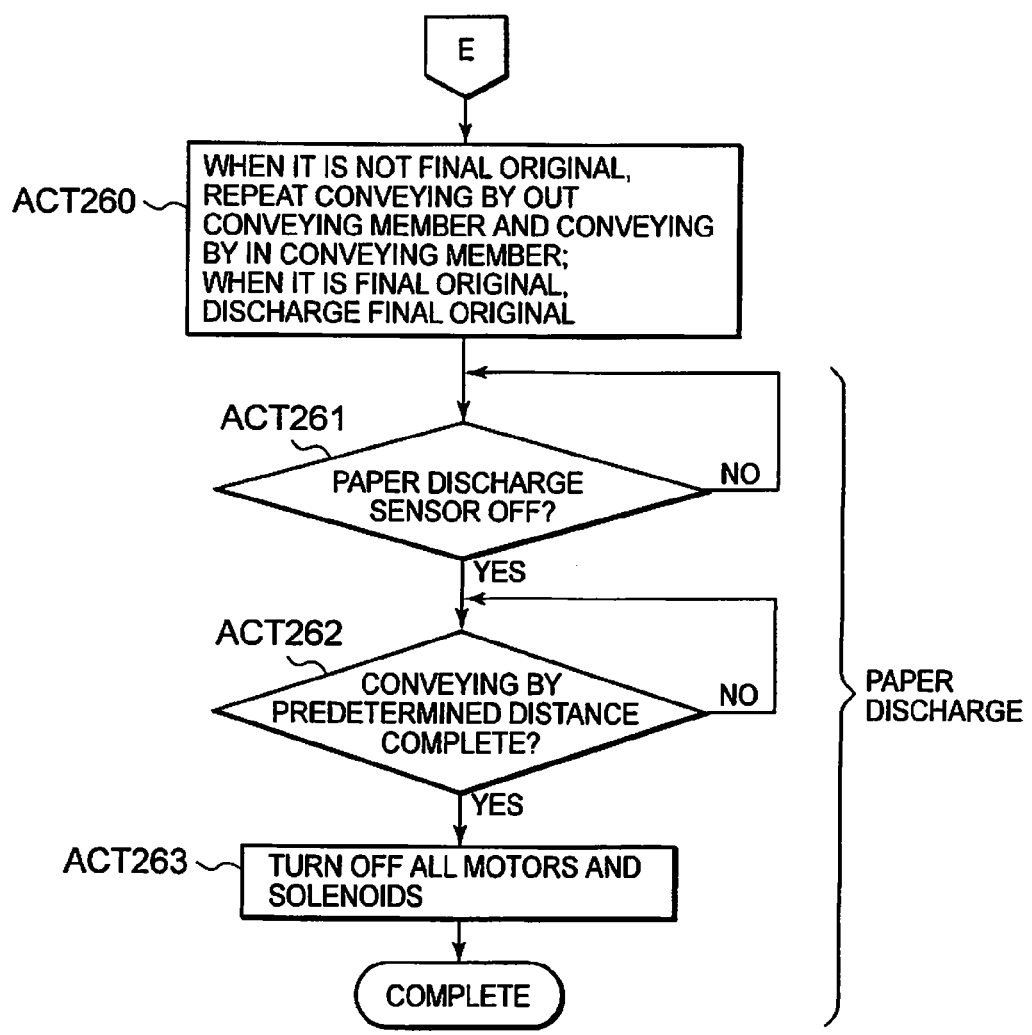
FIG. 10 is a flowchart showing the completion of the carrying according to the embodiment.

FIG. 4 shows a block diagram of a control system 120 mainly for the ADF 10. A main body control section 121 which controls, for example, an entire of an image forming apparatus having the image scanning device 100, controls a CPU 130 of the ADF 10 via an input-output interface 122. The CCD 110d and the CIS 60 of the scanner 110 input scanned data to the main body control section 121. The empty sensor 70, the registration sensor 71, the paper timing sensor OUT 72, the paper timing sensor IN 73, the pre-reading sensor 76, the reading sensor 77 and the paper discharge sensor 78 input the results of detection to the CPU 130.

The CPU 130 controls the pickup solenoid 81, the paper feed motor 80, the RGT motor 82, the gate solenoid 83, the intermediate OUT motor 84, the intermediate IN motor 86, the READ motor 87, the paper discharge motor 88 and the guide solenoid 58a.

A process of continuously carrying the original G will be described with reference to the flowcharts of FIG. 5 to FIG. 10. After power is turned on, the CPU 130 confirms in ACT 200 that the ADF 10 is closed. Detection is carried out at all the sensors in ACT 201 to confirm that there is no jam in the ADF 10. When the empty sensor 70 turns on in ACT 202, the CPU 130 confirms that there is the original G on the original tray 11, and sends an original-on signal to the main body control section 121. The CPU 130 waits for a paper supply request signal to be received from the main body control section 121. After receiving the paper supply request signal (Yes in ACT 203), the CPU 130 proceeds to ACT 206.

Figure 11:
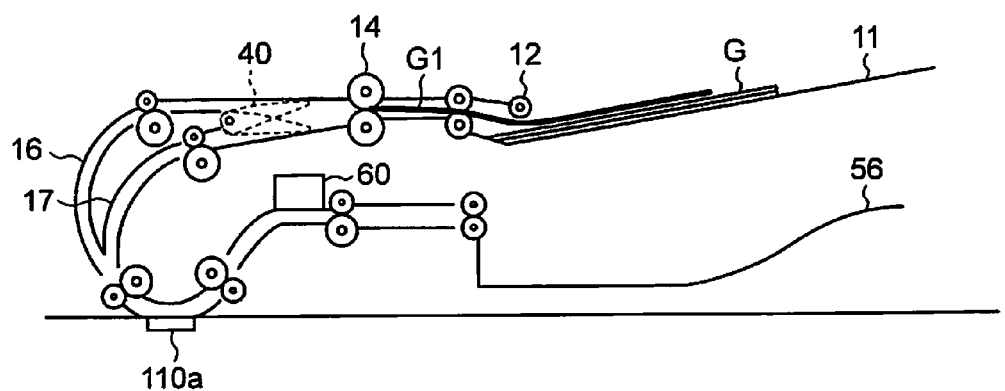
FIG. 11 is an explanatory view showing the state where the supply of the first sheet of the original is started according to the embodiment.

In ACT 206, the CPU 130 turns on the pickup solenoid 81 and turns on the paper feed motor 80 to rotate the pickup roller 12 and the separation paper supply rollers 13. The ADF 10 starts the supply of the first original G1. When the registration sensor (RGT sensor) 71 turns on in ACT 207, after the original G1 is carried for a predetermined time the CPU 130 turns off the paper feed motor 80 to turn off the gate solenoid 83 (ACT 208). As shown in FIG. 11, the first original G1 is contacted with the RGT roller pair 14 and has its forward end aligned, and stops. The CPU 130 sets the gate 40 so as to branch the first original G1 to the OUT carrying unit 26. When the registration sensor 71 does not turn on even after the lapse of a predetermined time in ACT 210, the CPU 130 determines that there is a jam of the original G1.

When the registration sensor 71 turns on in ACT 207, the CPU 130 starts the supply process of the second original G2 as an interrupt process, separately from the carrying process of the first original G1. However, the supply process of the second original G2 waits until the rear end of the first original G1 exits the registration sensor 71. After the registration sensor 71 changes from on to off in ACT 300 (ACT 301), the CPU 130 proceeds to ACT 206 and starts the supply of the second original G2.

Figure 12:
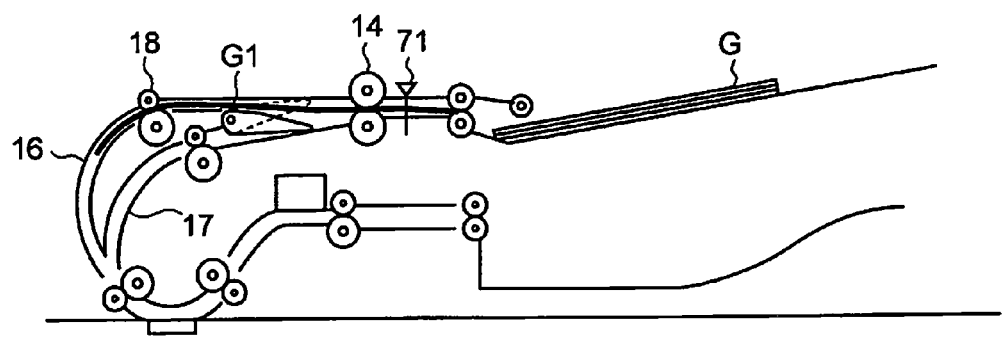
FIG. 12 is an explanatory view showing the state where the first sheet of the original is carried to the OUT carrying unit according to the embodiment.

When a predetermined time passes in ACT 211 and the original G1 is a sheet of an odd ordinal number (ACT 212), the CPU 130 turns on the RGT motor 82 and the intermediate OUT motor 84 to rotate the RGT roller pair 14 and the intermediate OUT roller pair 18 (ACT 214). The CPU 130 controls the intermediate OUT motor 84 and rotates the intermediate OUT roller pair 18 in accordance with the rotation speed of the RGT roller pair 14. The RGT roller pair 14 and the intermediate OUT roller pair 18 rotate at a uniform velocity. As shown in FIG. 12, the gate 40 branches the first original G1 to the OUT carrying unit 26.

Figure 13:
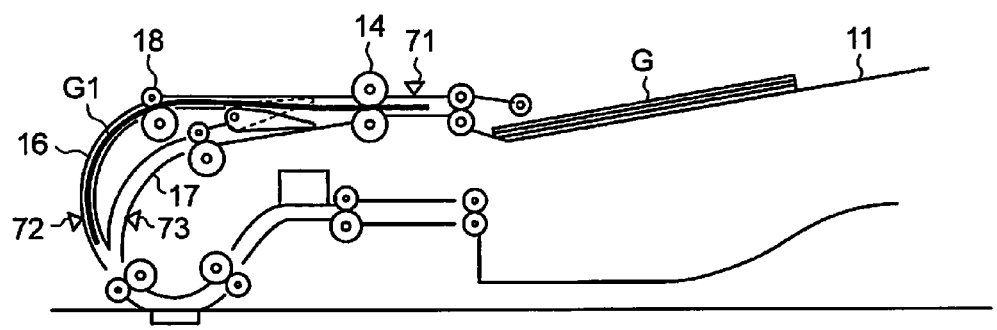
FIG. 13 is an explanatory view showing the standby of the first sheet of the original in the OUT carrying unit according to the embodiment.

When the paper timing sensor OUT 72 turns on in ACT 215, the CPU 130 drives the RGT motor 82 and the intermediate OUT motor 84 by a predetermined number of pulses and then stops these motors (ACT 216). As shown in FIG. 13, the first original G1 stops before the pre-scan roller pair 50. When the paper timing sensor OUT 72 does not turn on even after the lapse of a predetermined time in ACT 217, the CPU 130 determines that there is a jam of the original G1.

The CPU 130 waits for a carrying request signal to be received from the main body control section 121. After receiving the paper supply request signal (Yes in ACT 218), the CPU 130 proceeds to ACT 220. When the scanner 110 is available for scanning, the main body control section 121 sends a carrying request signal to the CPU 130. When there is a preceding original G, with the lapse of a predetermined time after the forward end of the preceding original G turns on the pre-reading sensor 76 (ACT 220), the CPU 130 proceeds to ACT 221.

In ACT 221, the CPU 130 turns on the READ motor 87 and the intermediate OUT motor 84 to rotate the intermediate OUT roller pair 18, the pre-scan roller pair 50, the post-scan roller pair 51 and the pre-discharge roller pair 52 at a speed according to an instruction from the main body control section 121. The timing when the rear end of the preceding original G passes the pre-scan roller pair 50 and the timing when the forward end of the first original G1 starts being carried by the pre-scan roller pair 50 are made coincident with each other. The pre-scan roller pair 50 carries the first original G1 to the READ original glass 110a in the state where the distance from the rear end of the preceding original G is close to 0 mm. At this time, the second pre-scan guide 58 is situated at the guide position shown in FIG. 2.

When the first original G1 is carried by a predetermined distance (Yes in ACT 230), the CPU 130 sends a scan start signal to the main body control section 121. In response to an instruction from the main body control section 121, the scanner 110 starts scanning an image on the face side of the original G1 (ACT 231).

Figure 14:
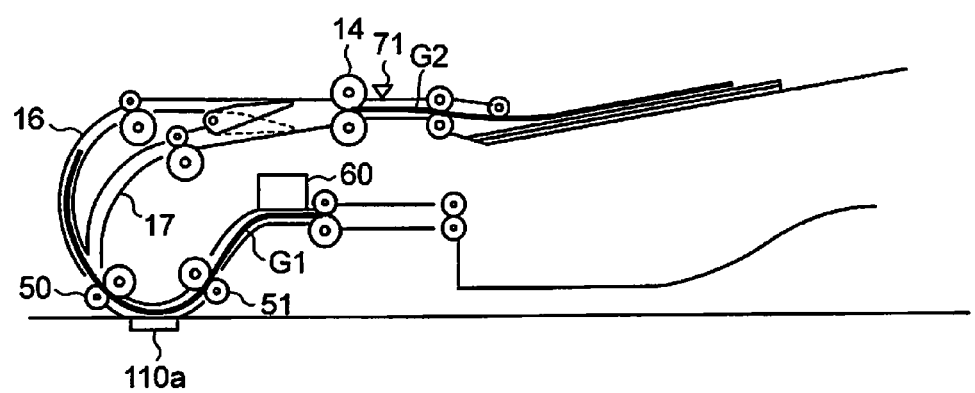
FIG. 14 is an explanatory view showing the state where the supply of the second sheet of the original is started according to the embodiment.

In parallel, as the rear end of the first original G1 exits the registration sensor 71 and the registration sensor 71 changes from on to off, the CPU 130 starts the supply of the second original G2 in ACT 300. As shown in FIG. 14, the first original G1 travels on the READ original glass 110a. The scanner 110 scans an image of the first original G1. The second original G2 is contacted with the RGT roller pair 14, has its forward end position aligned, and then stops.

Figure 15:
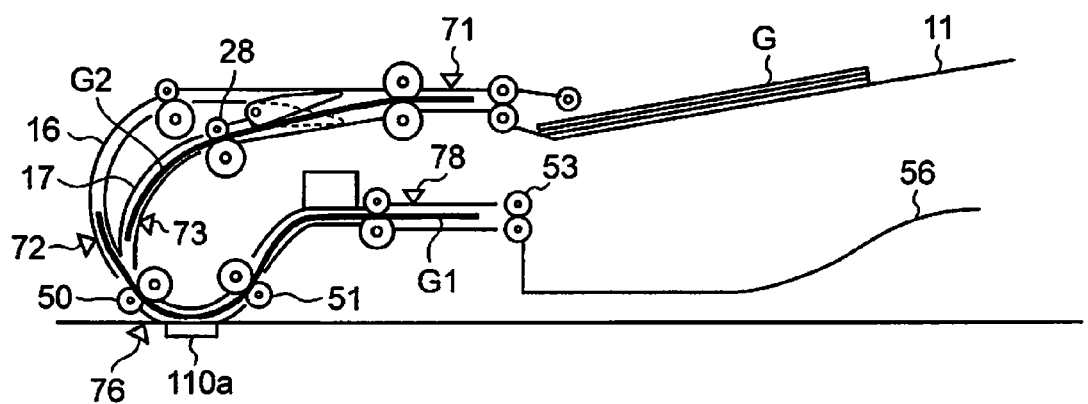
FIG. 15 is an explanatory view showing the state where the second sheet of the original is carried to the IN carrying unit according to the embodiment.

To carry the second original G2 in parallel, the CPU 130 turns on the registration sensor 71 (ACT 207) and then reaches ACT 212 via ACT 208 and ACT 211. In ACT 212, when the original G2 is a sheet of an even ordinal number, the CPU 130 proceeds to ACT 250. In ACT 250, the CPU 130 turns on the gate solenoid 83 and switches the gate 40 into the direction of branching the second original G2 to the IN carrying unit 27. In ACT 251, the CPU 130 turns on the RGT motor 82 and the intermediate IN motor 86 to rotate the RGT roller pair 14 and the intermediate IN roller pair 28. The CPU 130 controls the intermediate IN motor 86, adjusts the intermediate IN roller pair 28 to the rotation speed of the RGT roller pair 14, and thus rotates the RGT roller pair 14 and the intermediate IN roller pair 28 at an equal velocity. As shown in FIG. 15, the gate 40 branches the second original G2 to the IN carrying unit 27.

In ACT 231, the first original G1 continues traveling on the READ original glass 110a. The scanner 110 continues scanning the image of the first original G1. After scanning the post-scan roller pair 51 and the pre-discharge roller pair 52 carry the first original G1 in the direction of the paper discharge roller pair 53.

When the first original G1 turns on the paper discharge sensor 78 (Yes in ACT 232), the CPU 130 drives the paper discharge motor 88 to rotate the paper discharge roller pair 53 (ACT 233). In the case of double-side scan (Yes in ACT 236), the CPU 130 proceeds to ACT 237. In ACT 237, the CPU 130 scans an image on the back side of the first original G1 travelling in the paper discharge direction using the CIS 60.

When a predetermined number of pulses passes (ACT 238) after the scanner 110 starts scanning the image of the first original G1 in ACT 231, the image scanning on the face side of the first original G1 by the scanner 110 finishes (ACT 241). After the rear end of the original G1 exits the roller pair 51, the READ motor 87 and the intermediate OUT motor 84 are turned off (ACT 242). After that, the paper discharge roller pair 53 discharges the first original G1 to the paper discharge tray 56.

Parallel to the discharge of the first original G1, the CPU 130 continues carrying the second original G2. When the second original G2 turns on the paper timing sensor IN 73 in ACT 252 (Yes in ACT 252), the CPU 130 drives the RGT motor 82 and the intermediate IN motor 86 by a predetermined number of pulses and then stops the RGT motor 82 and the intermediate IN motor 86 (ACT 253). As shown in FIG. 15, the second original G2 stops before the pre-scan roller pair 50 in the IN carrying unit 27. When the paper timing sensor IN 73 does not turn on even after the lapse of a predetermined time in ACT 254, the CPU 130 determines that there is a jam of the original G2. The CPU 130 waits for a paper supply request signal for the second original G2 to be received from the main body control section 121. After receiving the paper supply request signal (Yes in ACT 256), the CPU 130 proceeds to ACT 257.

As a predetermined time passes after the forward end of the preceding original G (the first original G1) turns on the pre-reading sensor 76 in ACT 257, the CPU 130 proceeds to ACT 258. In ACT 258, the CPU 130 turns on the READ motor 87 and the intermediate IN motor 86 and rotates the intermediate IN roller pair 28, the pre-scan roller pair 50, the post-scan roller pair 51 and the paper discharge roller pair 52 at a speed according to an instruction from the main body control section 121. At this time, when the rear end of the preceding original G (the first original G1) does not exit the post-scan roller pair 51, the CPU 130 continues driving the READ motor 87.

Figure 16:
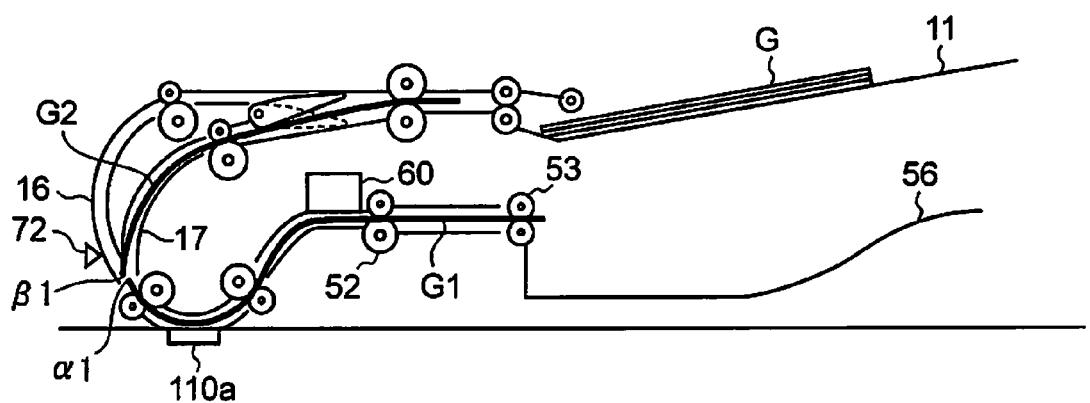
FIG. 16 is an explanatory view showing the state where the second sheet of the original following the first sheet of the original is carried according to the embodiment.

In ACT 258, the CPU 130 causes the timing when the preceding original G (the first original G1) passes the pre-scan roller pair 50 and the timing when the forward end of the second original G2 starts being carried by the pre-scan roller pair 50, to be coincident with each other. As shown in FIG. 16, the intermediate IN roller pair 28 carries the second original G2 to the pre-scan roller pair 50 in the state where the distance between the rear end α1 of the preceding original G (the first original G1) and the forward end β1 of the second original G2 is close to 0 mm.

To realize the state where the distance between the rear end α1 of the preceding original G (the first original G1) and the forward end β1 of the second original G2 is close to 0 mm, for example, the following measures can be taken.

Example 1

Figure 17:
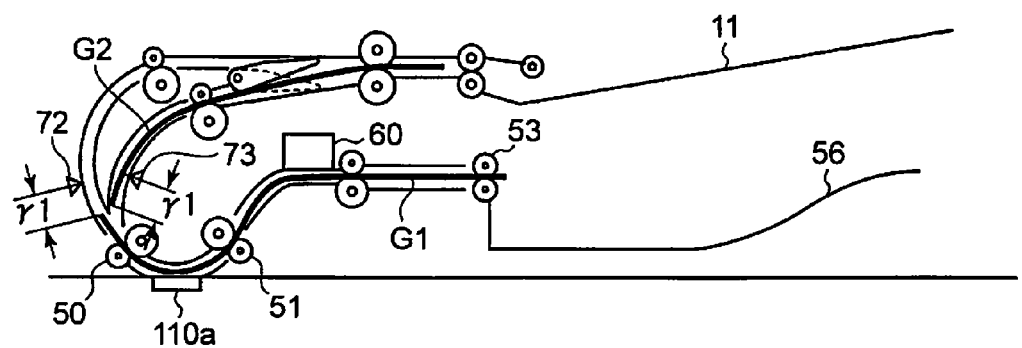
FIG. 17 is an explanatory view showing the distance between the first sheet of the original and the second sheet of the original according to the embodiment.

For example, the distance from the paper timing sensor OUT 72 to the pre-scan roller pair 50 and the distance from the paper timing sensor IN 73 to the pre-scan roller pair 50 are set to be equal. As shown in FIG. 17, after the paper timing sensor IN 73 is turned on, the second original G2 waits at a position advanced by a predetermined distance γ1. As the rear end of the preceding original G (the first original G1) exits the paper timing sensor OUT 72 and advances by the predetermined distance γ1, the CPU 130 turns on the READ motor 87 and the intermediate IN motor 86 in ACT 258 to carry the second original G2 in the direction of the READ original glass 110*a*. Thus, the distance between the rear end of the first original G1 and the forward end of the second original G2 can be made close to 0 mm.

Example 2

Alternatively, the timing of carrying the preceding original G1 (the first original G1) and the second original G2 may be adjusted in advance in accordance with the result of detection by the paper timing sensor OUT 72 and the result of detection by the paper timing sensor IN 73, thus realizing the state where the distance between the preceding original G (the first original G1) and the second original G2 is close to 0 mm.

Parallel to the continuous passing of the preceding original and the following original through the nip, the CPU 130 turns on and off the guide solenoid 58*a*. In continuously carrying the originals G, as the rear end of the preceding original exits the paper timing sensor OUT 72 (Yes in ACT 270), the CPU 130 carries out driving by a predetermined number of pulses. At the same time when the rear end of the original exits the pre-scan roller pair 50, the CPU 130 turns on the guide solenoid 58*a* (ACT 271) and proceeds to ACT 272. In ACT 272, the CPU 130 drives the guide solenoid 58*a* by a predetermined number of pulses after turning on, and then turns off the guide solenoid 58*a* after the rear end of the preceding original passes through the second pre-scan guide 58 and before image scanning of the following original starts. The CPU 130 then ends driving of the second pre-scan guide 58.

Figure 18:
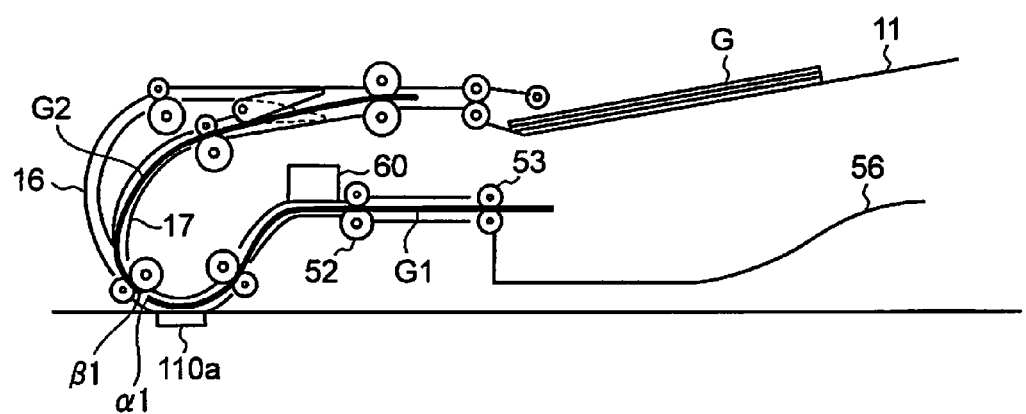
FIG. 18 is an explanatory view showing the state where the first sheet of the original and the second sheet of the original exit pre-scanning rollers according to the embodiment.

For example, as shown in FIG. 18, at the same time when the rear end α1 of the preceding original G (the first original G1) exits the pre-scan roller pair 50, the CPU 130 turns on the guide solenoid 58*a* (ACT 271). The second pre-scan guide 58 turns in the direction of arrow f and moves to the retreat position shown in FIG. 3. By the restoration force of the original G1 from the curvature, the rear end α1 of the first original G1 has its phase shifted outside of the curved path along the second pre-scan guide 58 situated at the retreat position and thus the rate of curvature is lowered.

The forward end β1 of the second original G2 moves forward along the normal line of the nip of the pre-scan roller pair 50. Although the distance from the rear end α1 of the first original G1 is close to 0 mm, the forward end β1 of the second original G2 avoids contacting the rear end α1 of the first original G1.

If the second pre-scan guide 58 is held at the guide position, there is a risk that the forward end β1 of the second original G2 may collide with the rear end α1 of the first original G1 exiting the pre-scan roller pair 50 because the distance between the rear end α1 of the first original G1 and the forward end β1 of the second original G2 is close to 0 mm. After exiting the pre-scan roller pair 50, the rear end α1 of the first original G1 is free. Therefore, if the forward end β1 of the second original G2 collides with the rear end α1 of the first original G1, the impact of the collision even affects the original G1 that is above the position of the READ original glass 110*a*. If the original G1 above the position of the READ original glass 110*a* is shifted, the image scanning accuracy of the scanner 110 may be impaired.

When the second pre-scan guide 58 is moved to the retreat position at the same time when the rear end α1 of the first original G1 exits the pre-scan roller pair 50, the collision of the forward end β1 of the second original G2 with the rear end α1 of the first original G1 is securely avoided and the original G1 is prevented from shifting during image scanning.

After the guide solenoid 58*a* is turned on and the rear end α1 of the first original G1 passes through the second pre-scan guide 58, the CPU 130 turns off the guide solenoid 58*a* (ACT 272). The guide solenoid 58*a* turns the second pre-scan guide 58 in the direction of arrow g and returns the second pre-scan guide 58 to the guide position shown in FIG. 2. When the guide solenoid 58*a* returns the second pre-scan guide 58*a* to the guide position, the second pre-scan guide 58*a* may have an impact on the second original G2. The forward end β1 of the second original G2 is free before reaching the post-scan roller pair 51 and tends to be shifted by an impact.

However, the forward end β1 of the second original G2 is immediately after passing through the second pre-scan guide 58 and is yet to reach the READ original glass 110*a*. The CPU 130 returns the second pre-scan guide 58 to the guide position before the scanner 110 starts scanning the image on the second original G2. Therefore, even if there is an impact on the second original G2 when the second pre-scan guide 58 is returned to the guide position, there is no risk of impairing the image scanning accuracy of the scanner 110 with respect to the second original G2.

In ACT 258, the second original G2 is carried in the direction of the READ original glass 110*a* in the state where the distance from the rear end α1 of the first original G1 is close to 0 mm. As the second original G2 is carried by a predetermined distance (Yes in ACT 230), the CPU 130 sends a scan start signal to the main body control section 121, as in the case of the first original G1. In response to an instruction from the main body control section 121, the scanner 110 starts scanning the image on the face side of the original G2 (ACT 231).

Figure 19:
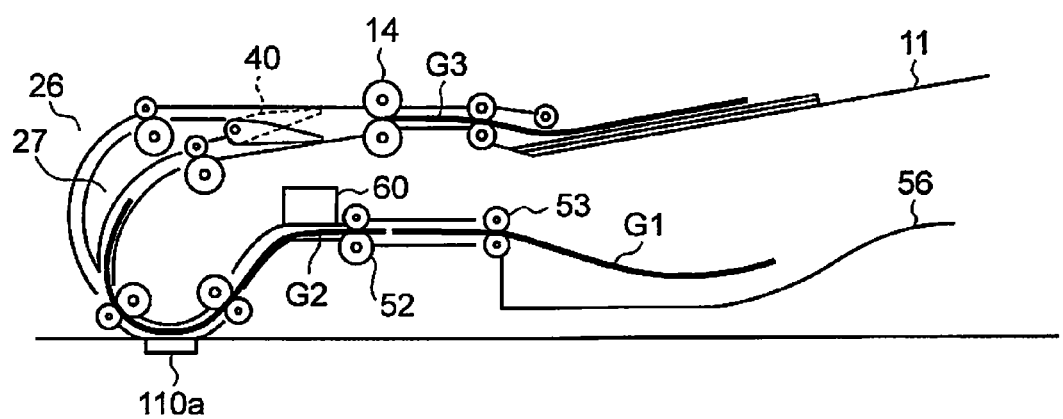
FIG. 19 is an explanatory view showing the state where the supply of the third sheet of the original is started according to the embodiment.

In parallel, as the rear end of the second original G2 exits the registration sensor 71 and the registration sensor 71 changes from on to off, the CPU 130 starts the supply of the third original G3. As shown in FIG. 19, the paper discharge roller pair 53 discharges the first original G1 in the direction of the paper discharge tray 56. The second original G2 travels on the READ original glass 110*a*. The third original G3 is contacted with the RGT roller pair 14, has its forward end position aligned and then stops.

To carry the third original G3 in parallel, the CPU 130 turns on the registration sensor 71 (ACT 207) and then reaches ACT 212 via ACT 208 and ACT 211. In ACT 212, if the original G3 is a sheet of an odd ordinal number, the CPU 130 proceeds to ACT 214. In ACT 208, the CPU 130 turns off the gate solenoid 83 and switches the gate 40 in the direction which the third original G3 to the OUT carrying unit 26. In ACT 214, the CPU 130 turns on the RGT motor 82 and the intermediate OUT motor 84 to rotate the RGT roller pair 14 and the intermediate OUT roller pair 18. The CPU 130 carries the third original G3 to the OUT carrying unit 26.

Figure 20:
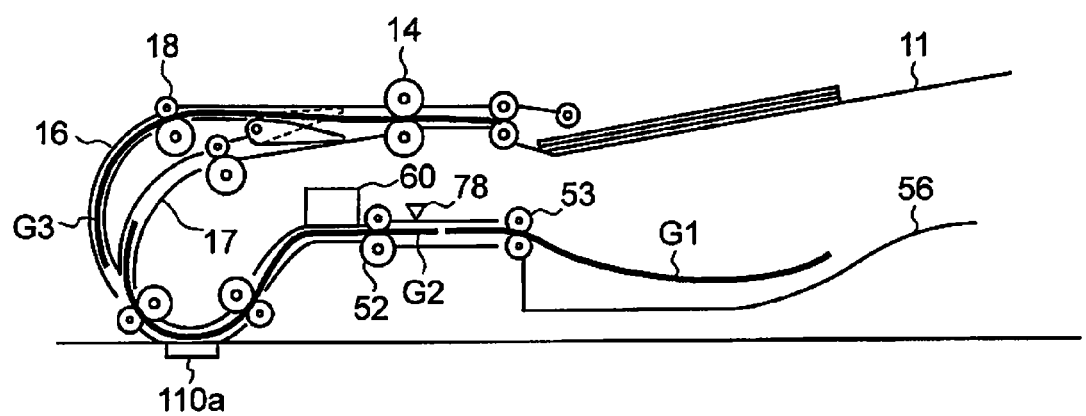
FIG. 20 is an explanatory view showing the state where the third sheet of the original is carried to the OUT carrying unit according to the embodiment.

As shown in FIG. 20, the first original G1 is placed on the paper discharge tray 56. The second original G2 travels on the READ original glass 110*a* and turns on the paper discharge sensor 78. The third original G3 stops before the pre-scan roller pair 50 in the OUT carrying unit 26. After that, the pre-scan roller pair 50 carries the third original G3 to the READ original glass 110*a* in the state where the distance from the rear end of the preceding original G (the second original G2) is close to 0 mm, as in the case of the second original G2.

When the original G is not the final original, the CPU 130 alternately repeats ACT 214 to ACT 221 (carrying the original G by the OUT carrying unit 26) and ACT 250 to ACT 258 (carrying the original G by the IN carrying unit 27) and continuously carries the originals in the state where the distance between the preceding original and the following original is close to 0 mm (ACT 260).

Figure 3:
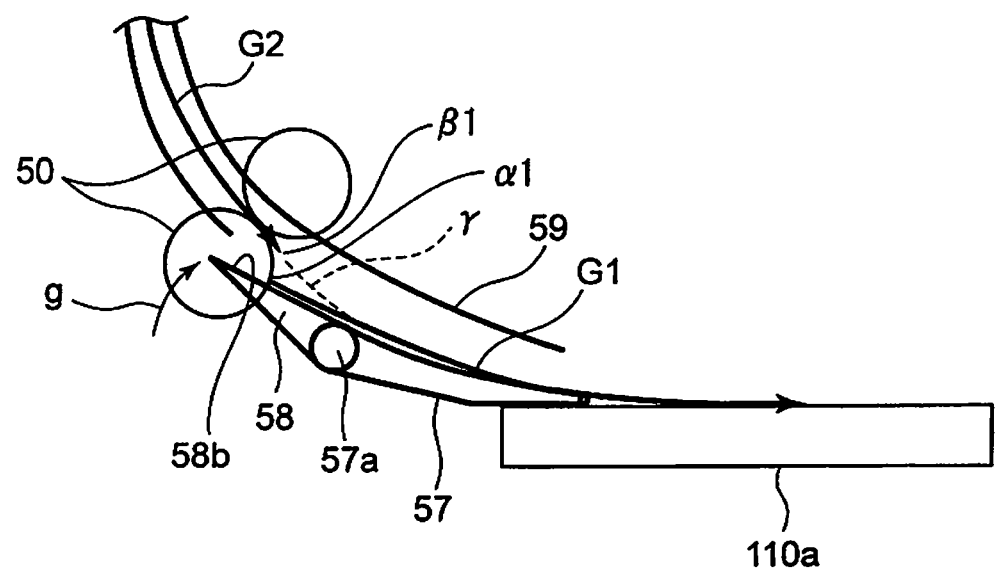
FIG. 3 is a schematic view of configuration showing the first pre-scanning guide and the second pre-scanning guide that is situated at a retreat position according to the embodiment.

During this process, the CPU 130 moves the second pre-scan guide 58 to the retreat position shown in FIG. 3 at the same time when the rear end of the preceding original exits the pre-scan roller pair 50. As the rear end of the preceding original passes through the second pre-scan guide 58, the CPU 130 returns the second pre-scan guide 58 to the guide position shown in FIG. 2 before the forward end of the following original reaches the position of the READ original glass 110*a*.

When the original G is the final original, when the paper discharge sensor 78 turns off (ACT 261), the paper discharge roller pair 53 carries the final original by a predetermined distance (ACT 262). The CPU 130 turns off all the motors and solenoids (ACT 263) and then completes the carrying of the original in the ADF 10.

According to this embodiment, when continuously scanning the original G, the ADF 10 continuously carries the originals G in the state where the distance between the preceding original G1 and the next original G2 is made close to 0 mm. Higher original carrying speeds of the ADF 10 can be achieved. The image scanning speed of the scanner 110 and hence productivity of the image forming apparatus using the scanner 110 can be improved. According to this embodiment, a collision of the currently image-scanned original with the following original is securely avoided at the time of high-speed carrying in the state where the distance between the preceding original G1 and the next original G2 is made close to 0 mm. A shift of the originals due to the collision of the originals is avoided and high scanning accuracy of the scanner 110 is achieved. Also, damage to the originals due to the collision is prevented.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and there equivalents are intended to cover such forms of modifications as would fall within the scope and spirit of the invention.

What is claimed is:

1. An auto document feeding device comprising:
   a carrying member configured to carry an original from an original setting unit to an image scanning unit;
   a fixed guide unit configured to change a carrying direction of the original and disposed between the carrying member and the image scanning unit;
   a movable guide unit configured to move between a guide position and a retreat position and disposed between the fixed guide unit and the carrying member; and
   a paper discharge unit configured to discharge the original which passed through the image scanning unit,
   wherein the movable guide unit is configured to move from the guide position to the retreat position when a rear end of a preceding original passes through the carrying member.

2. The device of claim 1, wherein the movable guide unit is configured to move from the retreat position to the guide position when the rear end of the preceding original is already at the fixed guide unit and before a forward end of a following original reaches the image scanning unit.

3. The device of claim 1, further comprising a detection unit configured to detect the carrying of the original.

4. The device of claim 1, wherein the fixed guide unit supports one end of the movable guide unit.

5. The device of claim 1, wherein the carrying member is controlled to cause a timing when a rear end of a preceding original reaches the image scanning unit and a timing when a forward end of a following original reaches the image scanning unit to be coincident with each other, and wherein the carrying member is configured to carry the preceding original and the following original from the original setting unit to the image scanning unit.

6. The device of claim 1, further comprising a second image scanning unit disposed in the paper discharge unit.

7. The device of claim 6, wherein the image scanning unit is configured to scan an image on a first side of the original, and the second image scanning unit is configured to scan an image on a second side of the original.

8. An image scanning apparatus comprising:
   an image scanning unit configured to scan an image on an original;
   a carrying member configured to carry an original from an original setting unit to the image scanning unit;
   a fixed guide unit configured to change a carrying direction of the original and disposed between the carrying member and the image scanning unit;
   a movable guide unit configured to move between a guide position and a retreat position and disposed between the fixed guide unit and the carrying member; and
   a paper discharge unit configured to discharge the original passed through the image scanning unit,
   wherein the movable guide unit is configured to move from the guide position to the retreat position when a rear end of a preceding original passes through the carrying member.

9. The apparatus of claim 8, wherein the movable guide unit is configured to move from the retreat position to the guide position when the rear end of the preceding original is already at the fixed guide unit and before a forward end of a following original reaches the image scanning unit.

10. The apparatus of claim 8, further comprising a detection unit configured to detect the carrying of the original.

11. The apparatus of claim 8, wherein the fixed guide unit supports one end of the movable guide unit.

12. The apparatus of claim 8, wherein the carrying member is controlled to cause a timing when a rear end of a preceding original reaches the image scanning unit and a timing when a forward end of a following original reaches the image scanning unit to be coincident with each other, and wherein the carrying member is configured to carry the preceding original and the following original from the original setting unit to the image scanning unit.

13. The apparatus of claim 8, further comprising a second image scanning unit disposed in the paper discharge unit.

14. The apparatus of claim 13, wherein the image scanning unit is configured to scan an image on a first side of the original, and the second image scanning unit is configured to scan an image on a second side of the original.

* * * * *